Oct. 12, 1965 A. W. HARRISON 3,211,263
ADJUSTER FOR VEHICLE BRAKES
Filed Aug. 14, 1963 6 Sheets-Sheet 5
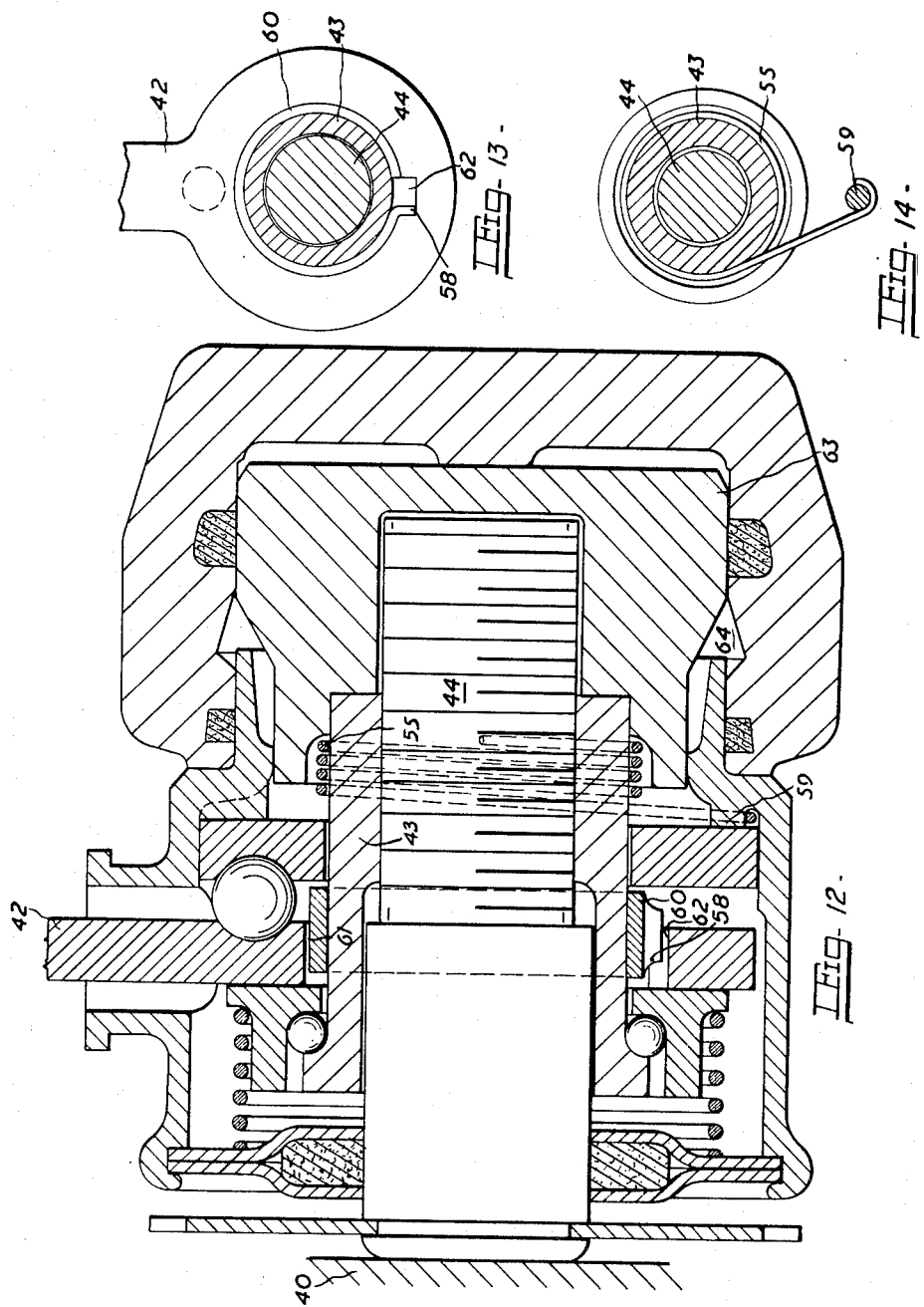
INVENTOR.
Anthony W. Harrison
BY
Scrivener and Parker
ATTORNEYS Oct. 12, 1965    A. W. HARRISON    3,211,263
ADJUSTER FOR VEHICLE BRAKES
Filed Aug. 14, 1963    6 Sheets-Sheet 6
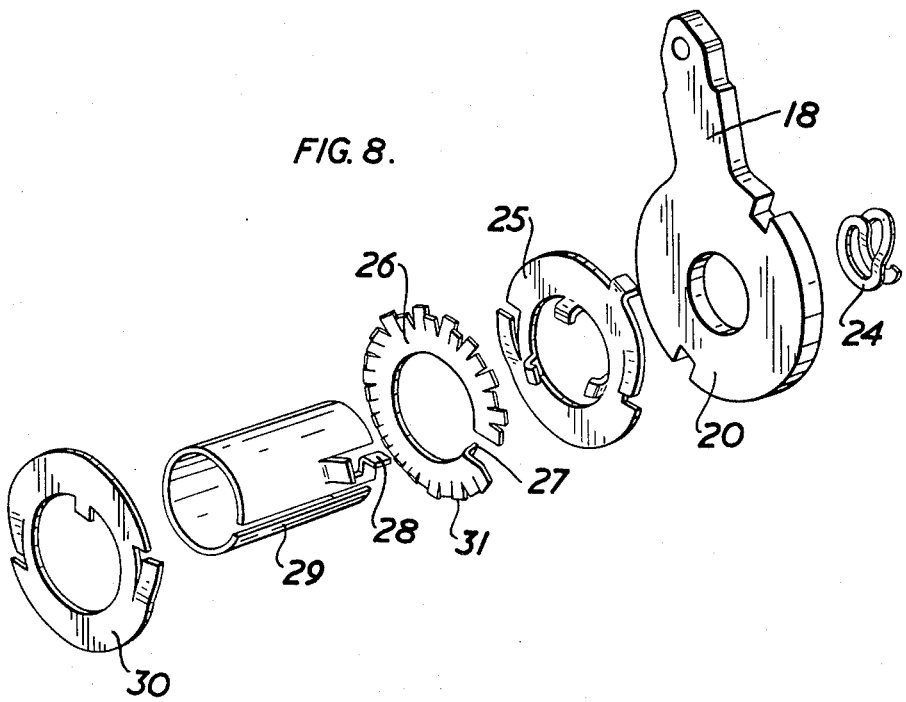
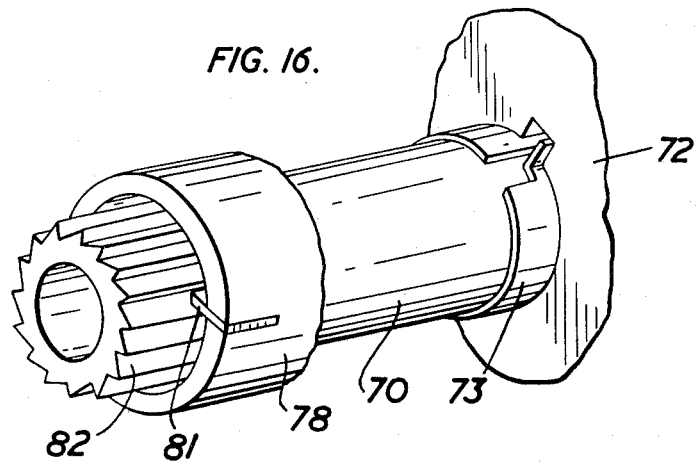

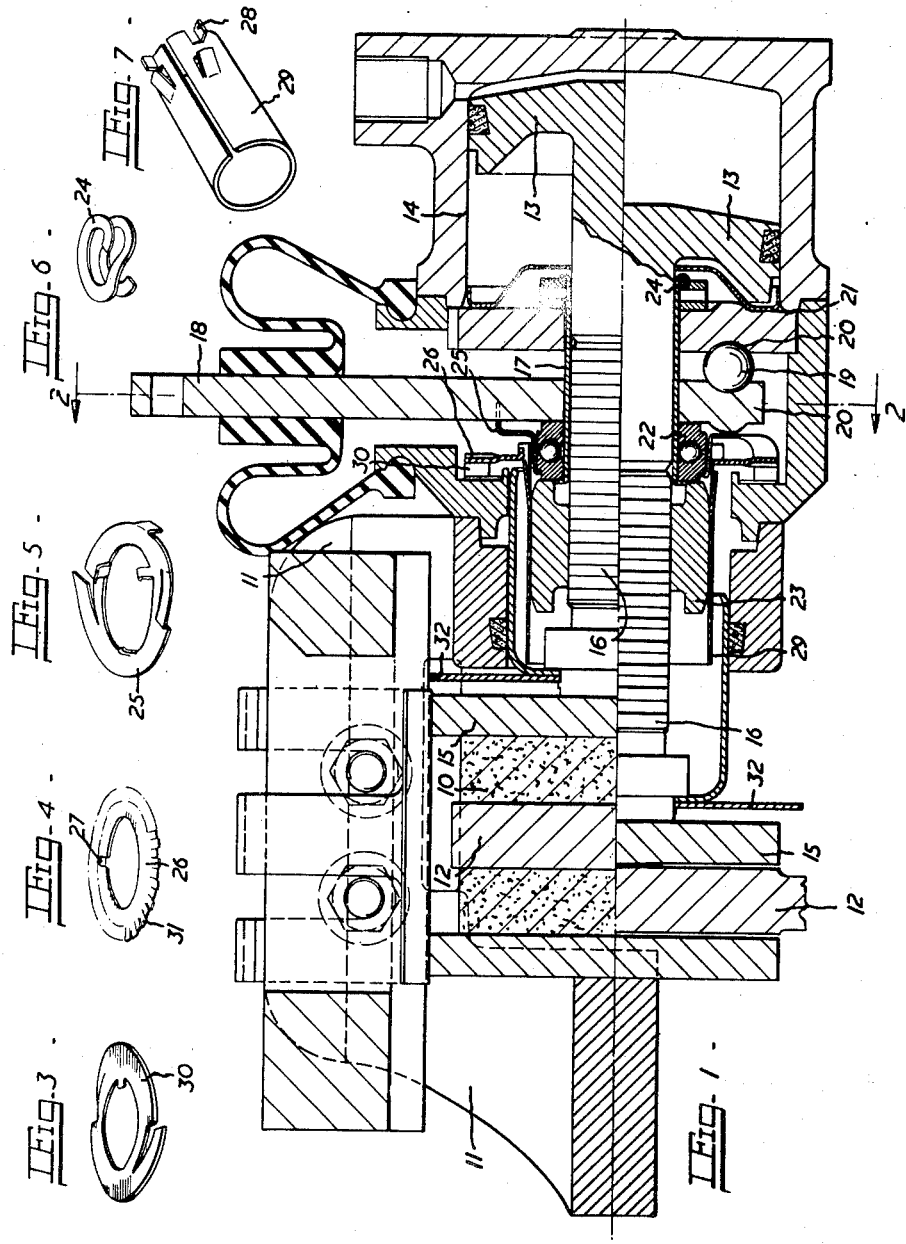

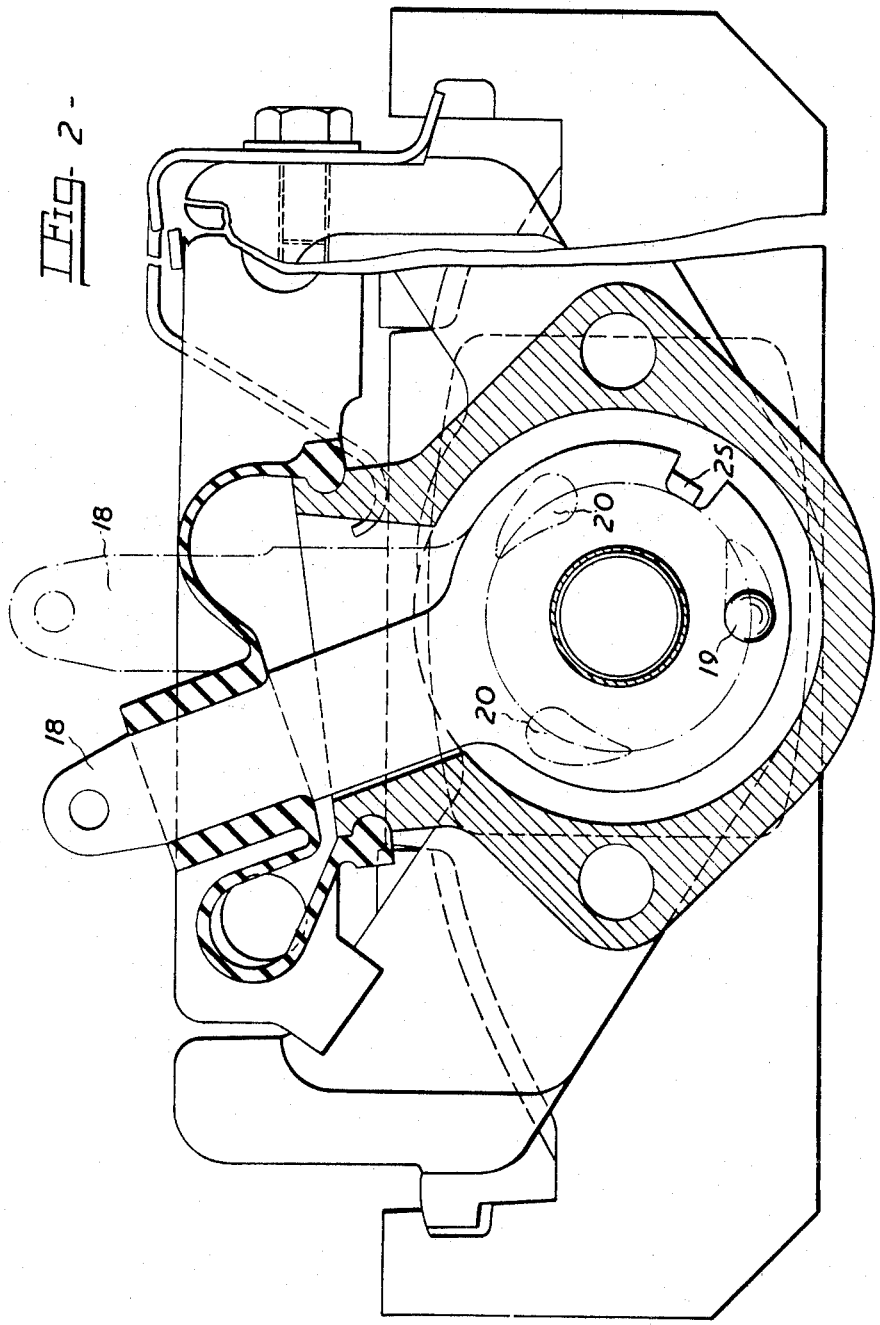

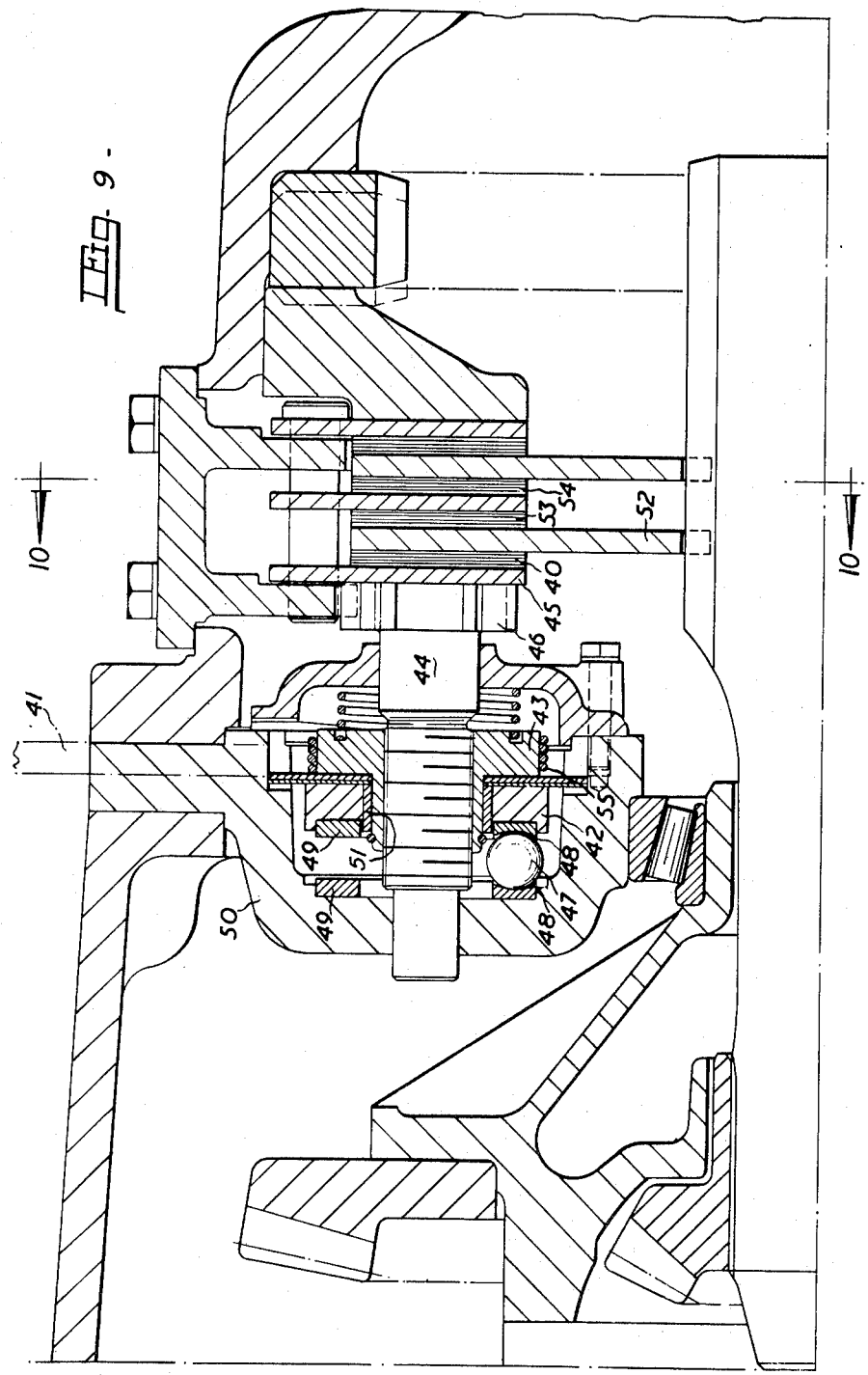

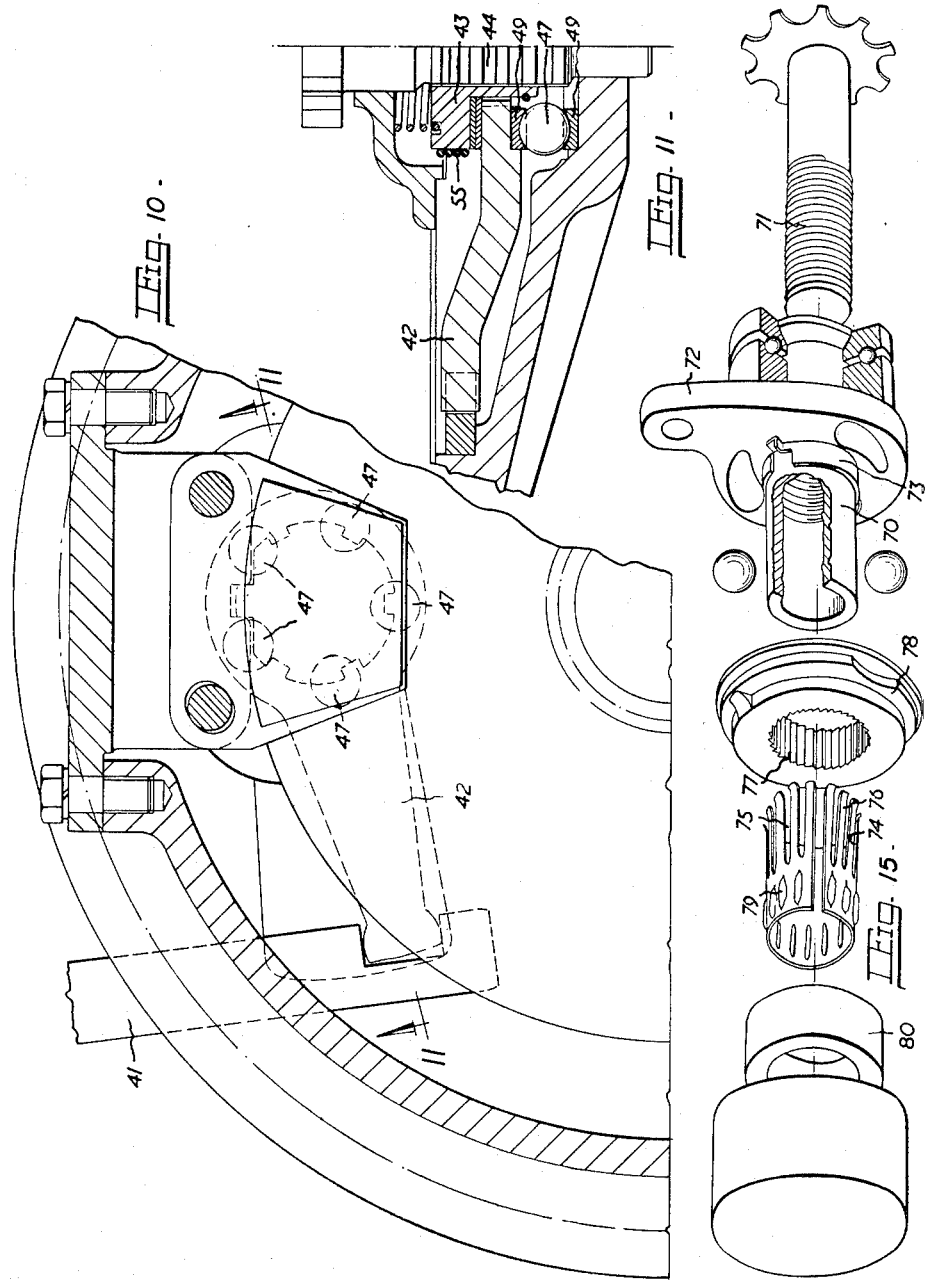

United States Patent Office 3,211,263
Patented Oct. 12, 1965

3,211,263
ADJUSTER FOR VEHICLE BRAKES
Anthony William Harrison, Selly Oak, Birmingham, England, assignor to Girling Limited, Tyseley, Birmingham, England, a British company
Filed Aug. 14, 1963, Ser. No. 302,181
Claims priority, application Great Britain, Aug. 14, 1962, 31,090/62
11 Claims. (Cl. 188—196)

This invention relates to a new or improved adjuster for vehicle brakes.

According to our invention, an adjuster for a vehicle brake comprises two members in screw-threaded engagement, of which one is rotatable through a slipping clutch from a brake-actuating member or a part moving with a brake-actuating member in such a manner that when the movement of the brake-actuating member exceeds a predetermined value an adjustment is made to take up wear of the friction surfaces.

The clutch is conveniently arranged to slip when the friction surfaces come into engagement, that is, at an early stage in the application of the brake, so that continued application of the brake does not affect the adjuster and the operation of the adjuster is independent of any deflections in the brake mechanism due to load.

A further advantage of the slipping clutch is that when the adjuster is returned to its original position, on replacement of worn friction members, the clutch prevents damage being done to the mechanism by an excessive return movement.

Some practical forms of a vehicle brake adjuster according to our invention are illustrated by way of example in the accompanying drawings in which:

FIGURE 1 is a longitudinal section of one form of adjuster incorporated in a disc brake;

FIGURE 2 is a transverse section on the line 2—2 of FIGURE 1;

FIGURES 3 to 7 inclusive are perspective views of detail parts forming the adjuster illustrated in FIGURE 1;

FIGURE 8 is an exploded view of the detail parts shown in FIGURES 3–7 which form the adjuster illustrated in FIGURE 1.

FIGURE 9 is a longitudinal section of another form of adjuster incorporated in a brake of the multi-disc type;

FIGURE 10 is a transverse section on the line 10—10 of FIGURE 9;

FIGURE 11 is a section on the line 11—11 of FIGURE 10;

FIGURE 12 is a longitudinal section of another form of adjuster incorporated in a disc brake;

FIGURE 13 is a sectional view on a reduced scale showing the lever engaging with the resilient ring illustrated in FIGURE 12;

FIGURE 14 is a sectional view on a reduced scale showing details of the anchorage for the coil spring illustrated in FIGURE 12;

FIGURE 15 is an exploded view of a modified form of adjuster; and

FIGURE 16 is an exploded view of an adjuster similar to that illustrated in FIGURE 15 but showing a modification.

In the embodiment of the invention illustrated in FIGURES 1 to 8 inclusive, an adjuster is incorporated in a disc brake in which a friction pad 10 mounted in a caliper 11 which straddles the periphery of a rotatable disc 12 is adapted to be applied to the disc by a piston assembly 13 working in an hydraulic cylinder 14 for normal service braking and by a hand lever (not shown) for parking or emergency braking. The piston assembly 13 acts on a rigid backing plate 15 carrying the friction pad 10 through an externally screw-threaded spindle 16 guided for axial movement in a direction at right angles to the surface of the disc in a sleeve 17. The friction pad 10 is actuated from the hand lever through a lever 18 which is angularly movable about the axis of the spindle 16, and balls 19 are located in co-operating conical or inclined recesses 20 in the rear face of the lever and a ring 21 fixed in the forward end of the cylinder so that on angular movement of the lever 18 relative to the ring the lever is moved towards the disc. The front face of the lever 18 bears through a ball thrust washer 22 on an internally screw-threaded adjusting nut 23 in engagement with the spindle 16 the nut and the spindle forming a strut of which the effective length is adjustable. The ends of the sleeve 17 are flanged to engage with the ball-thrust washer 22 and a spring washer 24 (FIGURE 6) engaging with the rear face of the ring 21.

A pawl 25 (FIGURE 5) coupled to the lever co-operates with a ratchet wheel 26 (FIGURE 4) carrying a dog 27 engaging with a complementary dog 28 on a split resilient sleeve 29 (FIGURE 7) fitting over and in close frictional engagement with the adjusting nut 23. A second pawl 30 (FIGURE 3) fixed to the housing prevents reverse rotation of the adjusting nut.

When the angular movement of the lever 18 in the application of the brake from the hand lever exceeds the spacing between adjacent teeth 31 of the ratchet wheel 26, the ratchet wheel and the split sleeve 29 will be rotated through one or more teeth of the ratchet wheel and the sleeve will take the adjusting nut 23 with it to advance the screw-threaded spindle 16 towards the brake disc until the resistance to the movement of the spindle causes the sleeve to slip on the adjusting nut. This will usually be arranged to occur as or soon after the friction pad engages the disc so that over adjustment is prevented.

For returning the screwed spindle 16 from the position shown in the lower half of FIGURE 1 to its initial position, for replacement of worn pads, a toothed wheel 32 which can be engaged by a screw driver or like tool inserted through an opening in caliper 11 is fixed to the inner end of the screw-threaded spindle 16. When the wheel 32 is turned, the adjusting nut 23 will traverse along the thread towards the disc, leaving a gap between itself and the ball thrust washer 22. This allows the screw-threaded spindle to be forced back to the new pad position as illustrated in the upper half of FIGURE 3.

In the alternative arrangement illustrated in FIGURES 9, 10 and 11, a friction pad 40 of a multi-disc brake is actuated from a hand lever 41 through a lever 42 which is angularly movable about an adjusting nut 43. The adjusting nut 43 is screw-threaded internally for engagement with a screw-threaded spindle 44 the nut and the spindle forming a strut of which the effective length is adjustable. The screw-threaded spindle 44 acts on a rigid backing plate 45 carrying the friction pad 40 through a thrust spindle 46 and balls 47 are located in co-operating conical inclined recesses 48 in seating rings 49 one of which is secured to a housing 50 while the other ring is attached to the lever 42 so that on angular movement of the lever relative to the ring 49 secured to the housing, the lever is moved towards the disc carrying with it the adjusting nut 42 and the spindle 44.

A split resilient sleeve 51 housed between the lever 42 and the adjusting nut 43 acts as a slipping clutch so that when the brake is applied by the lever the adjusting nut is rotated initially to advance the pad towards the disc 52, and so take up any wear on the friction pad 40 and friction pads 53 and 54.

Reverse movement of the nut is prevented by a coiled spring 55 wound on the outer surface of the nut 43 and having one end anchored, the direction in which the spring is wound being such that it allows the nut to rotate freely in a direction to advance the pad towards the disc, but grips it frictionally in the reverse direction.

In a modified construction illustrated in FIGURES 12, 13 and 14, in which corresponding numerals have been used to indicate corresponding parts, the slipping clutch comprises a resilient ring 60 housed in an annular recess 61 in the manually operated lever 42 which is angularly movable about the adjusting nut 43. The ring carries a projection 58 entering in a slot 62 in the lever 42 and the circumferential width of the projection is less than the circumferential width of the slot so that, when the brake is applied by the lever, the pad clearance is taken up before the ring is moved angularly by the lever. On further angular movement of the lever, it takes the split ring 60 with it and the ring moves the nut angularly in a direction towards the pad 40. This continues until the resistance to further rotation of the nut is sufficient to allow the ring to slip round on the nut.

Reverse movement of the nut is prevented by the coiled spring 55 wound on the outer surface of the nut 43 and having one end anchored on peg 59. The spring allows the split ring 60 to be returned to its initial position when the brake is released while leaving the nut in the position to which it has been advanced.

The split ring 60 may be so arranged that the frictional grip exerted by it on the nut is the same in both directions or it may be arranged that in the applying movement of the lever the ring is wound on the nut to increase its grip and in the other direction it is unwound to decrease its grip. The latter arrangement has the advantage that a lighter return spring is required for the lever.

Where the brake is also applied hydraulically by a piston 63 working in a cylinder 64, the piston may act on the screw-threaded spindle 44 with which the nut 43 engages or it may act on the nut. In the latter case as illustrated in FIGURE 12, the movement of the piston is limited to clearance take-up so it does not have to follow the spindle 44 throughout its adjusting movement. The cylinder can thus be of a reduced axial length and the complete assembly is extremely compact.

An alternative arrangement to the pawl 30 and the spring 55 in the arrangement of the adjuster described above for preventing reverse movement of the adjusting nut 24, 43 is illustrated in FIGURE 15, where a ratchet and pawl mechanism is included. As illustrated in FIGURE 15, an adjusting nut 70 is in screw-threaded engagement with a spindle 71 for applying a pad and backing plate assembly to a rotatable disc (not shown) and a lever 72 is angularly movable about the adjusting nut. The nut and the spindle comprise a strut of which the effective length is adjustable. A resilient spring clip 73 acts as a slipping clutch between the lever and the adjusting nut in the same manner as the resilient sleeve or ring described in the foregoing embodiments.

A pawl 74 located on the outer surface of the adjusting nut comprises a cylindrical sleeve formed from a thin plate of resilient sheet metal having a series of parallel slots 75 extending in from one end. The plate is rolled into the form of a cylinder and the free ends of the axially extending fingers 76 between the slots are adapted to form pawl teeth for engagement with ratchet teeth 77 in a fixed member 78 for controlling relative angular movement between the adjusting nut and the member.

The pawl is conveniently formed by a stamping operation followed by a rolling operation.

A series of angularly spaced raised ribs 79 may be formed in the plate in the stamping operation at the end remote from the fingers, and at this end the pawl is made a press fit between the adjusting nut and a concentric bush 80.

The pitch of the fingers 76 on the pawl is preferably different from the pitch of the ratchet teeth with which they engage, so that only some of the fingers are simultaneously in engagement and a vernier effect is obtained.

When the nut is moved angularly with the lever in the application of the brake the pawl teeth 76 ride over the ratchet teeth 77 in the fixed member. When the brake is released the co-operation of the pawl teeth with the ratchet teeth prevents reverse rotation of the nut.

In a modification illustrated in FIG. 16 a pawl 81 is mounted on the fixed member 78 for engagement with ratchet teeth 82 on the adjusting nut 70.

Our improved adjuster can be applied equally well to the disc brakes of the single-sided type in which the caliper or disc is axially movable and only one of the friction pads is positively actuated as described above, and to disc brakes in which the caliper and disc are fixed axially and both friction pads are positively actuated or to disc brakes in which the caliper can swing about an axis at right angles to the axis of the disc.

I claim:

1. Adjuster for a vehicle brake having a rotatable braking member, friction elements for engagement with said rotatable member, and actuating means for urging at least one of said friction elements into engagement with said rotatable member upon movement of said actuating means in brake applying direction, comprising a first member and a second member in cooperating screw-threaded engagement with said first member, said first and second members forming a strut disposed between said actuating means and one of said friction elements and of which the effective length is adjustable upon rotational movement of said second member relative to said first member, friction drive means including a yielding connection of predetermined frictional torque operatively connecting said second member with said actuating means, said connection including means for effecting rotation of said second member relative to said first member with and by said actuating means for lengthening said strut upon movement of the actuating means a distance exceeding a predetermined value in a brake applying direction, said predetermined frictional torque of said yielding connection being of a magnitude wherein said connection yields to permit said actuating means to move in a brake applying direction independently of said second member whenever there is a second torque opposing relative rotation between said first and second members which exceeds the predetermined frictional torque of said yielding connection, and means preventing reverse rotation of said second member relative to said first member.

2. The adjuster of claim 1 wherein said friction drive means includes a lost motion connection with said actuating means, whereby said actuating means is capable of a predetermined degree of movement independently of said second member before operating the latter.

3. The adjuster claim 1 wherein said first member comprises a threaded spindle and said second member comprises a nut in screw-threaded engagement with said spindle.

4. The adjuster of claim 3 wherein said friction drive comprises a resilient sleeve operatively connected to said actuating means and surrounding said nut in yielding frictional engagement therewith.

5. An adjuster for a vehicle disc brake having a rotatable disc, friction elements for engagement with opposite faces of said disc, and actuating means including an angularly movable lever for urging at least one of said friction elements into engagement with said rotatable disc, comprising a nut member in screw-threaded engagement with a spindle, said nut member and said spindle forming a strut disposed between said angularly movable lever and one of said friction elements and of which the effective length is adjustable by rotational movement of said nut member relative to said spindle, a resilient sleeve fitting over and in close frictional engagement with said nut, a racket wheel carrying a dog for engagement with a complementary dog on said resilient sleeve, a first pawl coupled to said actuating lever and co-operating with said ratchet wheel whereby when movement of said actuating lever exceeds the spacing between adjacent teeth in the application of the brake due to wear of said friction elements, said ratchet wheel, said resilient sleeve and said nut are rotatable and said spindle is advanced toward said disc until the friction torque of the screw-threaded engagement between said nut and said spindle exceeds the friction torque between said resilient sleeve and said nut thereby causing said sleeve to slip on said nut, and a second pawl fixed to a stationary part cooperating with said ratchet wheel to prevent reverse rotation of said nut.

6. An adjuster for a vehicle disc brake having a rotatable disc, friction elements for engagement with opposite faces of said disc, and actuating means including an angularly movable lever for urging at least one of said friction elements into engagement with said rotatable disc, comprising a nut member in screw-threaded engagement with a spindle, said nut member and said spindle forming a strut disposed between said angularly movable lever and one of said friction elements and of which the effective length is adjustable by rotational movement of said nut member relative to said spindle, a resilient sleeve between said angularly movable lever and said nut adapted to rotate said nut relative to said spindle and increase the effective length of said strut upon movement of the actuating means exceeding a predetermined value in the application of the brake due to wear of the said friction elements, said resilient sleeve being adapted to slip and prevent further rotational movement of said nut relative to said spindle when said strut is subjected to a predetermined loading by said actuating means and the frictional torque of the screw-threaded engagement between the said nut and said spindle exceeds the friction torque between said resilient sleeve and said nut, and a helical spring surrounding said nut and anchored at one end to a stationary part to prevent reverse rotation of said nut.

7. An adjuster as claimed in claim 6, wherein said resilient sleeve comprises a split ring of which one end is formed as a projection entering in a slot in the lever, the circumferential width of the projection being less than the circumferential width of the slot.

8. An adjuster for a vehicle disc brake having a rotatable disc, friction elements for engagement with opposite faces of said disc, and actuating means for urging at least one of said friction elements into engagement with said rotatable disc, comprising a nut member in screw-threaded engagement with a spindle, said nut member and said spindle forming a strut disposed between said actuating means and one of said elements and of which the effective length is adjustable by rotational movement of said nut member relative to said spindle, a resilient sleeve between said angularly movable lever and said nut adapted to rotate said nut relative to said spindle and increases the effective length of said strut upon movement of the actuating means exceeding a predetermined value in the application of the brake due to wear of said friction element, said resilient sleeve being adapted to slip and prevent further rotational movement of said nut relative to said spindle when said strut is subjected to a predetermined loading by said actuating means and the friction torque of the screw-threaded engagement between said nut and said spindle exceeds the friction torque between said resilient sleeve and said nut, and ratchet teeth on said nut, a pawl mounted on a fixed member and adapted to engage said ratchet teeth to prevent reverse rotation of said nut.

9. An adjuster for a vehicle disc brake having a rotatable disc, friction elements for engagement with opposite faces of said disc, and actuating means for urging at least one of said friction elements into engagement with said rotatable disc, comprising a nut member in screw-threaded engagement with a spindle, said nut member and said spindle forming a strut disposed between said actuating means and one of said elements and of which the effective length is adjustable by rotational movement of said nut member relative to said spindle, a resilient sleeve between said angularly movable lever and said nut adapted to rotate said nut relative to said spindle and increases the effective length of said strut upon movement of the actuating means exceeding a predetermined value in the application of the brake due to wear of said friction elements, said resilient sleeve being adapted to slip and prevent further rotational movement of said nut relative to said spindle when said strut is subjected to a predetermined loading by said actuating means and the friction torque of the screw-threaded engagement between said nut and said spindle exceeds the friction torque between said resilient sleeve and said nut, and ratchet teeth on a stationary member, a pawl located on the outer surface of said nut and adapted to engage with said ratchet teeth to prevent reverse rotation of said nut.

10. An adjuster as claimed in claim 9, wherein said pawl comprises a cylindrical sleeve formed from a thin plate of resilient sheet metal having a series of slots extending in from one end, and the free ends of axially extending fingers between said slots are adapted to form pawl teeth for engagement with said ratchet teeth on said stationary member.

11. An adjuster as claimed in claim 10, wherein the pitch of the fingers on said pawl is different from the pitch of the ratchet teeth with which they engage.

References Cited by the Examiner

UNITED STATES PATENTS

| | | | |
|---|---|---|---|
| 1,446,702 | 2/23 | Hiscutt | 188—79.5 |
| 2,837,179 | 6/58 | Jeppsson | 188—196 |
| 2,949,173 | 8/60 | Peras | 188—196 |
| 3,115,217 | 12/63 | Butler | 188—72 |
| 3,146,861 | 9/64 | Hodkinson | 188—196 |

FERGUS S. MIDDLETON, *Primary Examiner.*

DUANE A. REGER, ARTHUR L. LA POINT,
*Examiner.*